3,113,609
TIRE CHANGER
Walter A. Bishman, Minneapolis, Minn., assignor to Bishman Manufacturing Company, Osseo, Minn., a corporation of Minnesota
Filed Apr. 5, 1961, Ser. No. 100,891
1 Claim. (Cl. 156—1.17)

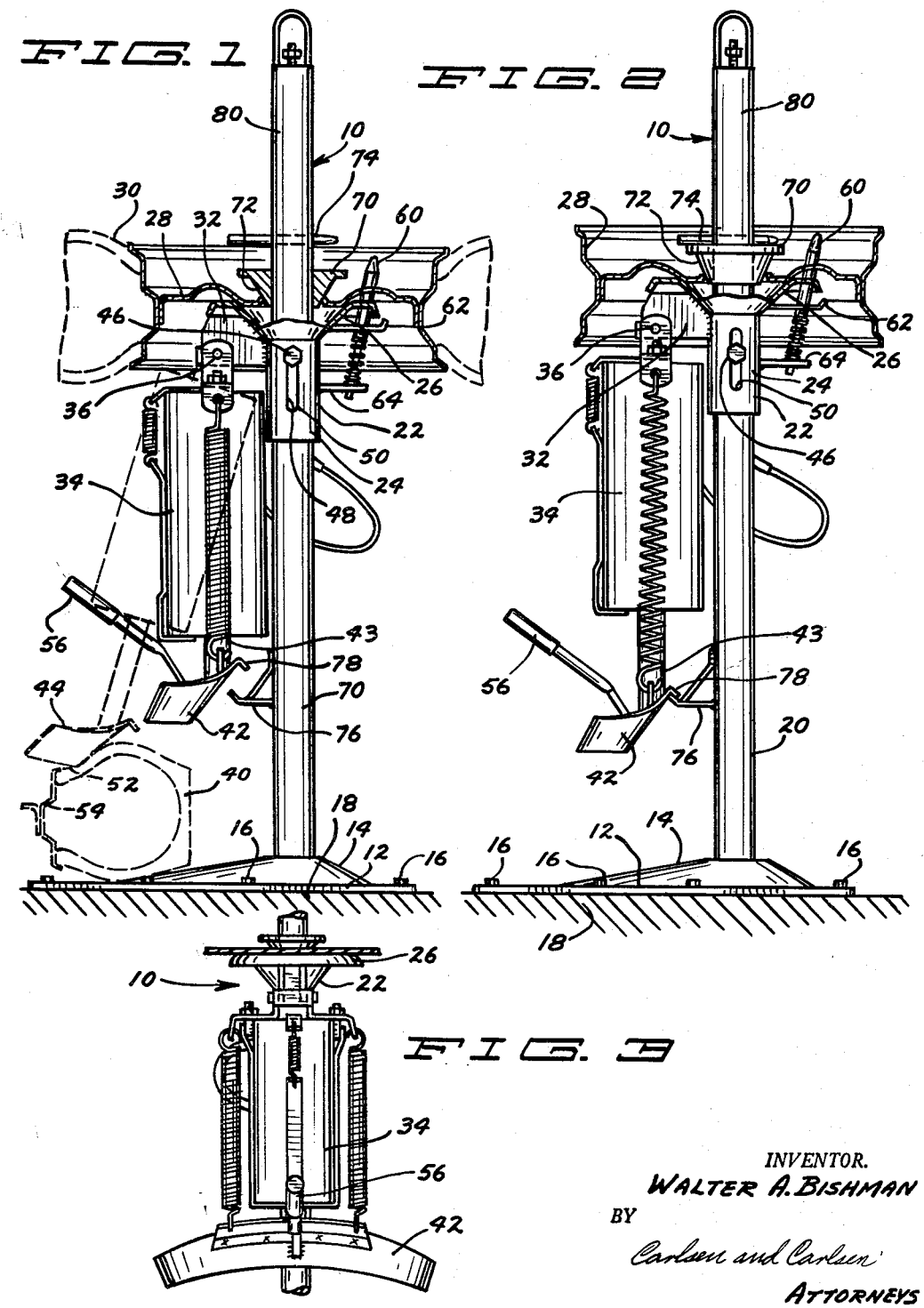

The present invention relates to tire repair equipment and more particularly to a device commonly known as a tire changer which is used for mounting and demounting a vehicle tire from the rim or wheel.

In recent years, numerous devices have been proposed for mounting and demounting tires semi-automatically. As a result, semi-automatic tire changing equipment has become commonplace in almost every establishment where this type of work is performed. Heretofore, the devices used to perform this work have been relatively large in size and bulk and employ relatively large number of moving parts which of course adds considerably to the cost of these machines.

It is therefore a primary object of this invention to provide an improved tire changer which has been greatly simplified in comparison to prior devices of this type through the elimination of a number of parts.

It is another object of this invention to provide an improved tire changer of relatively low cost which utilizes a single prime mover or pressure means to break the bead of the tire as well as to clamp the tire in a fixed position on the device for mounting and demounting the tire from the rim.

It is a still further object of this invention to provide an improved tire changer which is rugged in construction, reliable in operation and which can be manufactured at a considerably reduced cost.

Stated briefly the invention includes a frame and a support member movably attached to the frame to support the rim of a tire upon which work is to be performed. A prime mover or pressure member, such as a pneumatic cylinder is provided to forceably separate the bead of a tire from the rim and also to retain the rim securely in position on the frame. The pressure member includes a movable member operatively associated with said pressure member. A bead breaker tool is operatively connected to one of said members. The other member is operatively connected to the support member. A selectively engageable means is provided to limit the movement of the bead breaker tool whereby operation of said pressure member is adapted to move said bead breaker tool or said tire support member selectively as desired. A selectively engageable retainer means is provided to limit the movement of the tire rim on the frame.

These and other more detailed and specific objects will be disclosed in the course of the following specification, reference being had to the accompanying drawings, in which—

FIG. 1 is a side elevational view of the tire changer according to a preferred form of the present invention, partially in section and showing an alternative position of the pressure means and bead breaker tool by dotted lines.

FIG. 2 is a view similar to FIG. 1 but illustrating the device as it appears with the rim of the tire clamped securely in position.

FIG. 3 is a partial side elevational view of the apparatus of FIGS. 1 and 2.

Referring now to the drawings which illustrate a preferred form of the present invention, there is shown a tire changer 10 having a base 12 formed from a sheet material and provided with an elevated portion 14 near one side edge thereof. Around the periphery of the base 12 are provided a plurality of openings (not shown) to receive bolt 16 or other suitable means for securely retaining the base 12 in a position on the floor 18.

Rigidly connected to the base member 12 is a vertically disposed elongate frame member 20. Frame member 20 preferably comprises a cylindrical post member such as a metal tube.

Mounted movably on frame member 20 intermediate the ends thereof is a support member 22. Support member 22 preferably comprises a tubular portion 24 telescopically and slidably mounted over the frame member 20. A horizontally disposed circumferential flange member 26 attached to portion 24 is adapted to support the rim 28 of a tire 30 when the tire is to be mounted or demounted.

Support member 22 also includes a radially extending pivot bracket 32 to which a prime mover or pressure means such as pneumatic cylinder 34 is operatively and movably connected. The connection between cylinder 34 and bracket 32 preferably comprises a pivot 36. The cylinder 34 is in this way connected to the support member 22 for pivotal movement with respect thereto about a horizontal axis. The pressure means also includes a movable pressure element including a piston (not shown) within cylinder 34 and a connecting rod 43. Attached to the movable pressure element at the free end of rod 43 is a bead breaker tool 42.

When the apparatus is to be used for breaking the bead of the tire away from the rim, the tire is removed from the vehicle and placed in the dotted line position designated 40 as shown in FIG. 1. The bead breaker tool 42 is then placed in the dotted line position 44. Next compressed air is admitted to the cylinder 34 thereby causing the bead breaker tool 42 to move downwardly with respect to the base 12 and frame member 20. The support member 22 is prevented from moving upwardly by a retainer lug 46 affixed to the frame member 20 and extending outwardly through an aperture 48 in the side of the support member 22. The aperture 48 is elongated and the axis thereof is parallel to the axis of movement of support member 22 on frame member 20.

When the support member 22 is moved upwardly on the frame member 20 by the pressure means, the lower end 50 of aperture 48 abuts against the lug 46. Coaction between lug 46 and the end 50 of aperture 48 thus provides means for limiting upward movement of the support 22, with respect to frame member 20. As a result, continued downward movement of the movable pressure element with respect to cylinder 34 causes the bead breaker tool 42 to move downwardly against the bead 52 thereby forceably separating the bead 52 from the wheel rim 54. As can be seen, engagement between lug 46 and the upper end of aperture 48 provides means for limiting downward movement of the support 22 on the frame. The tire can be rotated manually until a different portion of the bead is presented in position beneath the bead breaker tool 42. For convenience of operation, the bead breaker tool 42 is provided with a handle 56 to enable the operator to easily and quickly place the tool 42 in position against the bead 52 of the tire.

After the bead of the tire has been separated from the rim as described above the tire and wheel rim is placed over the frame member 20 and is allowed to rest upon the circumferential flange 26 of the support member 22 as shown in FIGS. 1 and 2.

Undesired rotational movement of rim 28 is prevented by a locking means such as pin 60 which is telescopically mounted within suitable openings in a pair of horizontally disposed fittings 62 and 64 which are rigidly attached to support 22 preferably by welding. The pin 60 projects upwardly through an opening (not shown) in the circumferential flange 26 and thence through one of the bolt openings in the rim of the tire. The pin 60 is urged upwardly by means of a spring 66.

After the tire is placed on support 22, a wheel chuck 70 is placed telescopically over the upper end of frame member 20 until the lower surface 72 of the chuck contacts the edge of the central opening in rim 28. A chuck retaining means such as pin 74 is then passed through suitable transverse openings in the frame member 20.

To securely lock the tire in position on the frame, the bead breaker tool 42 is engaged with a selectively engageable retainer means or hook 76 rigidly attached to the frame member 20, a complementary hook 78 being provided on the bead breaking tool as shown in FIGS. 1 and 2 and compressed air is introduced into the pressure cylinder 34. Since downward movement of the movable pressure element and bead breaker tool 42 is prevented by engagement between the hook members 78 and 76, the cylinder 34 will then move upwardly with respect to the frame 20. As the cylinder 34 moves upwardly, it, of course, carries with it the support member 22, support flange 26 and tire rim 28. Upward movement of these parts continue until chuck 70 engages the retainer pin 74. When the chuck thus engages the retainer pin 74, the wheel rim 28 is securely retained in position on the frame member 20.

A conventional mounting and demounting rod or tool (not shown) can then be placed between the tire 30 and the rim 28 with one side of the center portion thereof abutting against the portion 80 of the frame member 20. The operator can then drive the tool around the circumference of the tire to either mount or demount the tire on the rim in a conventional manner.

A number of tire changers, according to the present invention, have been manufactured and sold. They have proved to be economical to manufacture, rugged in construction and reliable in operation. They were immediately accepted by the trade. Moreover, significant manufacturing economies have resulted from the fact that several parts previously considered essential have been eliminated from the present invention. As can be seen, the pressure means or cylinder 34 serves the dual purpose since it operates the bead breaker tool 42 and also locks the wheel in position on the frame 22 when the tire is to be mounted or demounted.

It is understood that suitable modifications may be made in the structure as disclosed, provided such modifications come within the spirit and scope of the appended claim. Having now therefore fully illustrated and described my invention, what I claim to be new and desire to protect by Letters Patent is:

In a wheel holder for use in tire changing, an upright post and means pivotally connecting the upper end of an extensible and contractible air cylinder, having a downwardly extendable tire tool at the lower end thereof, to the upper portion of the post for swinging movement of the cylinder between inner and outer portions relative to the post, a wheel chuck adapted to be removably mounted in fixed position on the post above said pivotal connection means, interengageable hook means mounted on the tire tool and post for selective interengagement to lock the tool against downward extension when the cylinder is in its inner position, said cylinder pivotal connection means including a support member slidably mounted on the post for limited up and down movement of the cylinder and said pivot means thereon, and said support member integrally carrying at its upper end a circumferential flange in downward axially opposing relation to said wheel chuck for movement of the flange toward and away from the chuck as the cylinder is respectively extended and contracted when said hook means are interengaged.

References Cited in the file of this patent
UNITED STATES PATENTS

| | | |
|---|---|---|
| 2,439,135 | Johnson et al. | Apr. 6, 1948 |
| 2,513,756 | Smyser | July 4, 1950 |
| 2,616,487 | Parks | Nov. 4, 1952 |
| 2,692,013 | Duquesne | Oct. 19, 1954 |
| 2,818,108 | Wells | Dec. 31, 1957 |
| 2,962,065 | Moore | Nov. 29, 1960 |